United States Patent [19]
Selser et al.

[11] Patent Number: 6,123,107
[45] Date of Patent: Sep. 26, 2000

[54] APPARATUS AND METHOD FOR MOUNTING MICROMECHANICAL FLUID CONTROL COMPONENTS

[75] Inventors: Michael J. Selser, Livermore; Errol B. Arkilic, Boulder Creek; Babak A. Taheri, San Francisco, all of Calif.

[73] Assignee: Redwood Microsystems, Inc., Menlo Park, Calif.

[21] Appl. No.: 09/368,456

[22] Filed: Jul. 9, 1999

[51] Int. Cl.[7] ............................................. F16K 11/10
[52] U.S. Cl. ................................... 137/884; 137/271
[58] Field of Search ............................... 137/269, 271, 137/884; 251/11

[56] References Cited

U.S. PATENT DOCUMENTS

3,589,387  6/1971  Raymond ............................. 137/261
5,964,239  10/1999  Loux et al. ............................ 137/15

Primary Examiner—John Fox
Attorney, Agent, or Firm—William S. Galliani; Pennie & Edmonds LLP

[57] ABSTRACT

An apparatus for mounting micromechanical fluid control components includes a manifold interface plate adaptable for connection to a manifold substrate oriented in a horizontal plane. The manifold interface plate receives mounting stress forces from the manifold substrate along the horizontal plane. An orthogonal component plate is connected to the manifold interface plate in a vertical plane with respect to the horizontal plane of the manifold substrate. The orthogonal component plate includes an orthogonal mounting surface with a micromechanical fluid control component mounted on it. The position of the micromechanical fluid control component on the orthogonal mounting surface substantially isolates the micromechanical fluid control component from the mounting stress forces.

20 Claims, 11 Drawing Sheets

APPARATUS AND METHOD FOR MOUNTING MICROMECHANICAL FLUID CONTROL COMPONENTS

BRIEF DESCRIPTION OF THE INVENTION

This invention relates generally to the precise control of fluids, such as the precise control of fluids in semiconductor processing equipment. More particularly, this invention relates to a technique for mounting micromechanical fluid control components.

BACKGROUND OF THE INVENTION

Micromechanical devices (also called microelectromechanical (MEM) devices, micromachined devices, and nanostructures) are micron scale three-dimensional objects constructed using semiconductor processing techniques. As used herein, the term micromechanical refers to any three-dimensional object that is at least partially constructed in reliance upon semiconductor processing techniques.

Figure 1:
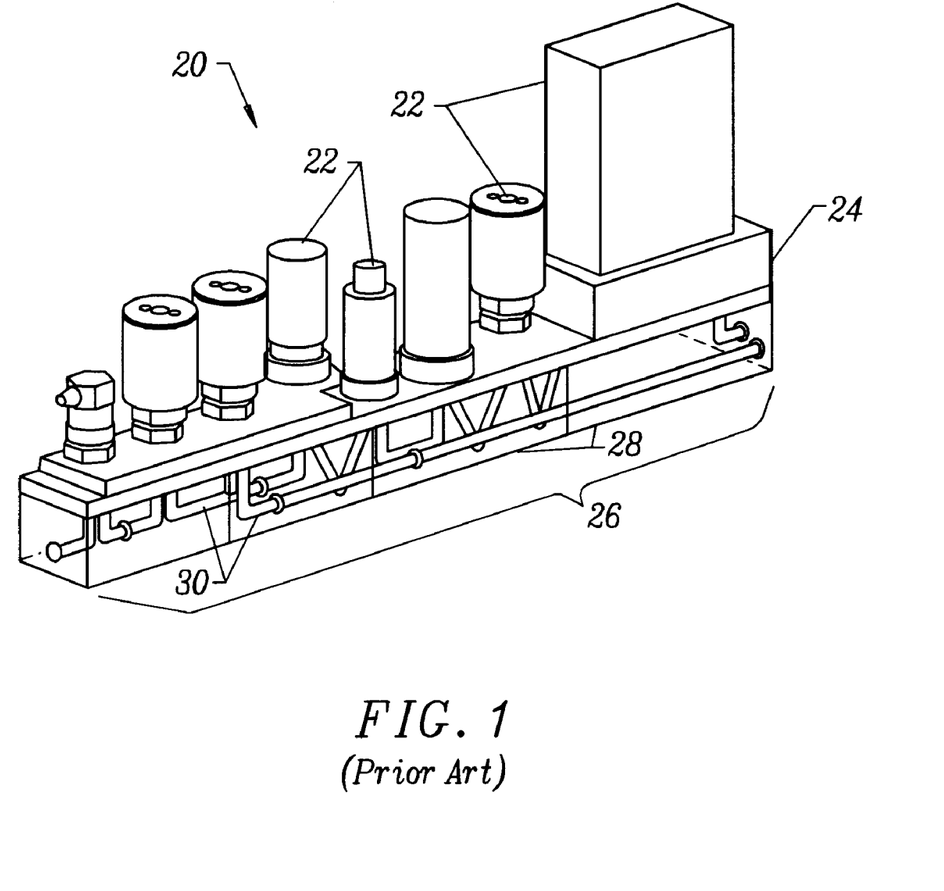
FIG. 1 illustrates a prior art gas stick.

Micromechanical devices are utilized as fluid control devices. As used herein, the term fluid refers to either a gas or a liquid. Precise fluid control is important in many applications ranging from drug delivery to semiconductor processing equipment. FIG. 1 illustrates a prior art "gas stick" 20 used in semiconductor processing equipment. The gas stick 20 precisely controls a fluid in the form of a gas. The gas stick 20 includes a set of gas control components 22, which may include shut-off valves, pressure sensors, mass flow controllers, filters, purifiers, pressure gauges, and the like. Each gas control component 22 is mounted on a component substrate 24.

The gas stick 20 also includes a manifold substrate 26 including individual manifold segments 28. The manifold segments 28 of the manifold substrate define gas channels 30 through which a gas passes. More particularly, the gas is routed from the gas channel 30, into a gas control component 22, back to the gas channel 30, into another gas control component 22, and so on.

Figure 2:
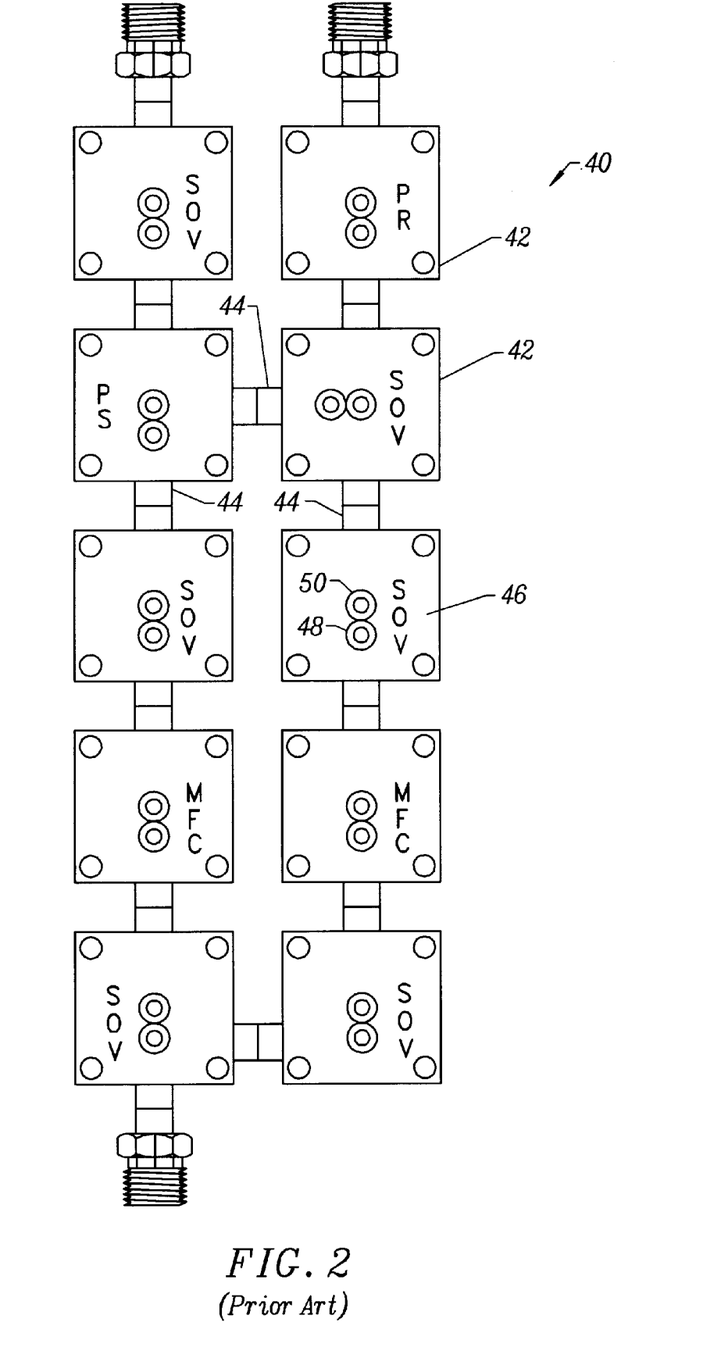
FIG. 2 illustrates a prior art manifold substrate.

FIG. 2 illustrates a prior art manifold substrate 40 that may be used to construct a gas stick. The manifold substrate 40 includes individual manifold segments 42 connected by piping 44. Each manifold segment 42 includes a manifold segment face 46 with a first gas aperture 48 and a second gas aperture 50 to respectively receive and transmit a controlled gas. A gas control component (not shown) is mounted at each manifold segment 42 to process the received gas and then transmit the gas back to the manifold substrate 40. By way of example, FIG. 2 illustrates a manifold substrate configured to receive ten gas control components: six shut-off valves (SOV), two Mass Flow Controllers (MFC), one pressure sensor (PS), and one pressure regulator (PR). Observe that each gas control component requires its own manifold segment. Thus, the manifold substrate 40 consumes a relatively large space and is relatively expensive.

Figure 3:
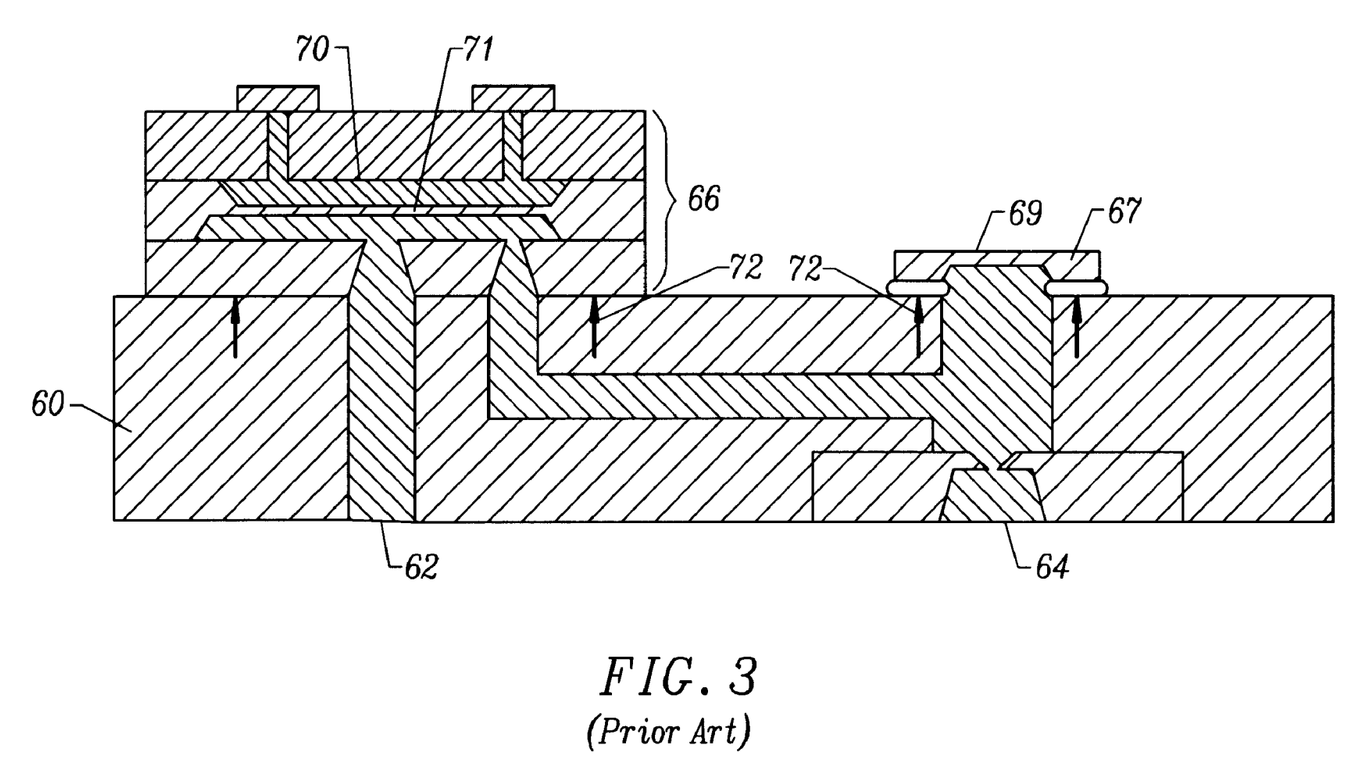
FIG. 3 illustrates prior art micromechanical fluid control component including a proportional valve and a pressure sensor.

FIG. 3 is a side cross-sectional view of a prior art device including a fluid control component substrate 60 with an input port 62 and an output port 64. Mounted on the fluid control component 60 is a first micromechanical gas control component 66 in the form of a normally open proportional valve and a second micromechanical gas control component in the form of a pressure sensor 67. The gas control component 66 includes a membrane 68 and a membrane control chamber 70. Fluid 71 in the membrane control chamber 70 is selectively heated, thereby expanding the volume of the membrane control chamber 70, causing the membrane 68 to deflect and thereby obstruct fluid flow in the input port 62. The deflection of the membrane 69 associated with the pressure sensor 67 is used to measure the pressure of the controlled fluid.

Observe in FIG. 3 that the micromechanical gas control components 66 and 67 are parallel (mounted in the same horizontal plane) as the component substrate 60. In turn, the component substrate 60 is parallel (mounted in the same horizontal plane) as the manifold segment face 46. This configuration leads to a number of problems in the prior art.

The primary problem associated with this prior art configuration is that it exposes components 66 and 67 to stresses induced from sources other than the controlled fluid. For example, the components 66 and 67 are subject to mechanical or thermally induced mounting stress forces, generally illustrated with arrows 72. The mounting stress forces are due to the mechanical coupling between the components and the substrate, or are due to thermal expansion mismatch between the components and the substrate. In the case of the pressure sensor 67, these stresses are mistakenly processed as signals from the controlled fluid, leading to erroneous output signals.

The mounting stress forces can cause failure in the die attach material between the components and the substrate. In some cases, the mounting stress forces can actually break the fluid control components.

To avoid these problems, some silicon pressure sensors are mounted to a surface using a soft, compliant material, such as silicone or RTV. Soft materials are used in order to isolate the component from thermally or mechancially induced package stresses. Unfortunately, these materials are inappropriate for a large class of applications. In particular, these materials are inappropriate for use in the control and distribution of gases for semiconductor processing. In this context, the gases may be corrosive or toxic. The ideal attachment of the sensor to the substrate or package is hermetic. Hermetic seals are typically quite hard, and will transfer package stress directly to the sensor. As a consequence, alternative methods of mechanically isolating a fluid control component from its substrate must be used.

Semiconductor processing equipment also requires continued cleanliness of the fluid control components. The fluid control device must not corrode, nor generate particles that would affect the semiconductor fabrication process. This limitation eliminates virtually all soft, compliant materials from consideration as candidates for component attachment.

In view of the foregoing, it would be highly desirable to provide an improved technique for mounting fluid control components. Ideally, such a technique would provide relatively compact and efficient fluid control structures.

SUMMARY OF THE INVENTION

The apparatus of the invention includes a manifold interface plate adaptable for connection to a manifold substrate oriented in a horizontal plane. The manifold interface plate receives mounting stress forces from the manifold substrate along the horizontal plane. An orthogonal component plate is connected to the manifold interface plate in a vertical plane with respect to the horizontal plane of the manifold substrate. The orthogonal component plate includes an orthogonal mounting surface with a micromechanical fluid control component mounted on it. The position of the micromechanical fluid control component on the orthogonal mounting surface substantially isolates the micromechanical fluid control component from the mounting stress forces.

Another embodiment of the apparatus of the invention includes an orthogonal component plate adapted for direct connection to a manifold substrate defined in a horizontal plane. The orthogonal component plate is oriented in a vertical plane with respect to the horizontal plane of the manifold substrate. The orthogonal component plate includes an orthogonal mounting surface with a micromechanical fluid control component mounted on it. The position of the micromechanical fluid control component on the orthogonal mounting surface substantially isolates the micromechanical fluid control component from mounting stress forces arising from the manifold substrate.

The method of the invention includes the step of attaching a manifold interface plate to a manifold substrate oriented in a horizontal plane. The manifold interface plate receives mounting stress forces from the manifold substrate along the horizontal plane. A micromechanical fluid control component is then positioned on an orthogonal mounting surface of an orthogonal component plate connected to the manifold interface plate in a vertical plane with respect to the horizontal plane of the manifold substrate. The position of the micromechanical fluid control component on the orthogonal mounting surface substantially isolates the micromechanical fluid control component from the mounting stress forces.

The mounting technique of the invention substantially eliminates mounting stresses on the micromechanical fluid control component, thereby reducing signal drift for the component and physical damage to the component. An embodiment of the invention corrects for any signal drift that may still arise. The technique of the invention facilitates compact architectures, thereby reducing the size and expense of fluid control components.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 4:
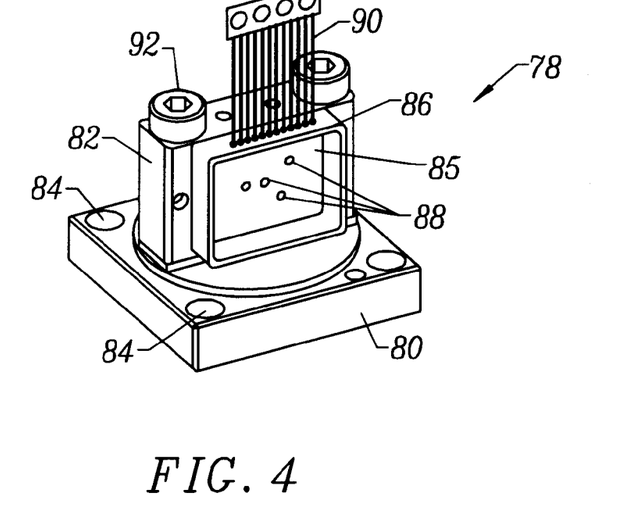
FIG. 4 illustrates an orthogonal mounting apparatus for fluid control devices in accordance with an embodiment of the invention.

FIG. 4 illustrates an orthogonal fluid control mounting apparatus 78 in accordance with an embodiment of the invention. The mounting apparatus 78 includes a manifold interface plate 80 and an orthogonal component plate 82. The manifold interface plate 80 includes manifold interface apertures 84. The manifold interface plate 80 is connected to a manifold substrate (e.g., substrate 26 in FIG. 1 or substrate 40 in FIG. 2). Bolts or other fastening devices are positioned in the manifold apertures 84 to establish a connection with the manifold substrate.

The orthogonal component plate 82 includes an orthogonal mounting surface 85. As its name implies, the orthogonal mounting surface is used to mount micromechanical fluid control components. Observe that the micromechanical fluid control components are in a vertical plane that is orthogonal to the horizontal plane of the manifold interface plate. Thus, the mounting stress forces experienced by the manifold interface plate are isolated from the fluid control components. This configuration improves the accuracy and reliability of the fluid control components since they are no longer subject to stresses that impact their performance and physical integrity.

FIG. 4 also illustrates gas ports 88 in the orthogonal mounting surface 85. The gas ports 88 establish fluid communication between the micromechanical fluid control component (not shown in FIG. 4) and the interior channels of the orthogonal fluid control mounting apparatus 78. FIG. 4 also illustrates an electronics housing 86 that may be used to enclose the micromechanical fluid control component or components mounted on the orthogonal mounting surface 85. A ribbon cable connector 90 may be used to route signals from the electronics housing 86 to an external computer or other electronics (not shown).

FIG. 4 also illustrates bolts 92 which may be used to attach the orthogonal component plate 82 to the manifold interface plate 80. The orthogonal plate 82 and the manifold interface plate 80 may be separate elements that are subsequently attached. Alternately, the manifold interface plate 80 and orthogonal component plate 82 may be machined as a single piece. Preferably, the manifold interface plate 80 is formed of 316L stainless steel for semiconductor processing equipment applications. Other materials, for instance TEFLON, can be used where bio-compatibility is required, such as in polymerase chain reaction or liquid chromatography analysis systems.

Figure 5:
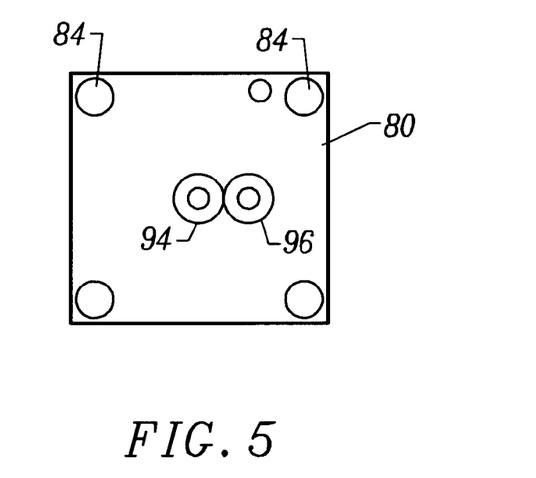
FIG. 5 is a bottom view of a manifold interface plate utilized in accordance with the device of FIG. 4.

FIG. 5 is a bottom view of the manifold interface plate 80. The figure illustrates the manifold interface apertures 84. The figure also illustrates a first gas aperture 94 and a second gas aperture 96, which are used to establish fluid communication with channels 30 in a manifold substrate 26, for example of the type shown in FIG. 1.

Figure 6:
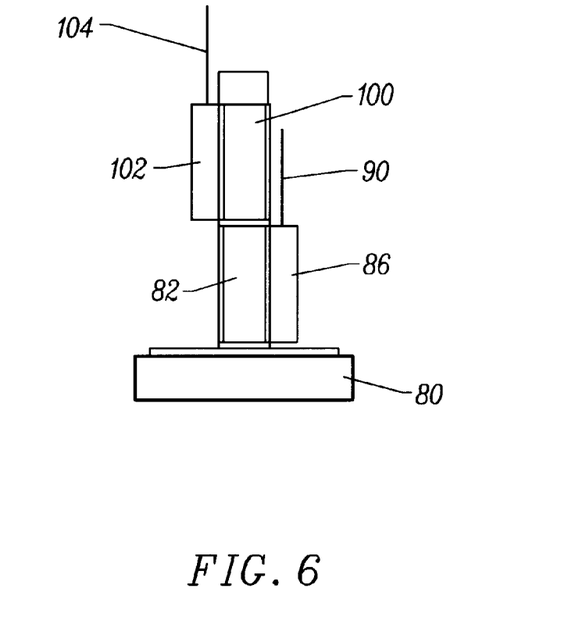
FIG. 6 is a side view of stacked orthogonal mounting devices in accordance with an embodiment of the invention.

FIG. 6 illustrates a stacked implementation of the invention. In particular, the figure illustrates a first orthogonal component plate 82 positioned on a manifold interface plate 80. The figure also illustrates the electronic housing 86 and ribbon cable connector 90 associated with the first orthogonal component plate 82. Positioned on top of the first orthogonal component plate 82 is a second orthogonal component plate 100. The second orthogonal component plate 100 is of the same form as the first orthogonal component plate 82. Thus, the second orthogonal component plate 100 includes an electronics housing 102 and a ribbon cable connector 104.

Figure 7:
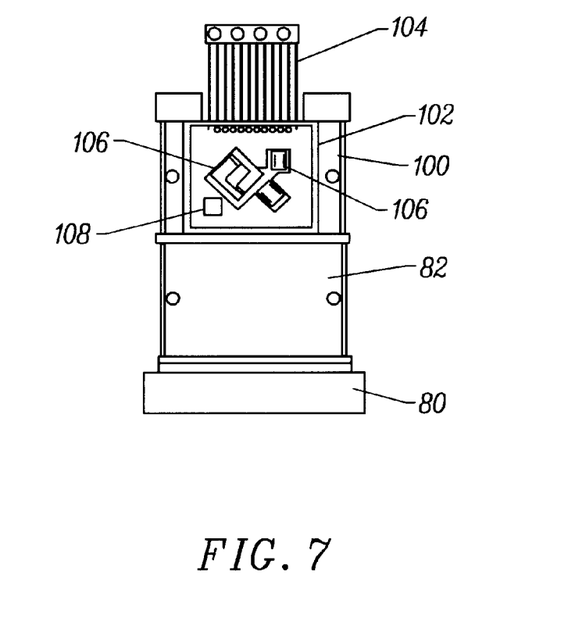
FIG. 7 is a front view of the apparatus of FIG. 6.

FIG. 7 is a front view of the device of FIG. 6. The figure illustrates micromechanical fluid control devices 106 positioned on the second orthogonal component plate 100. The figure also illustrates a micro-controller 108 positioned on the second orthogonal component plate 100.

Figure 8:
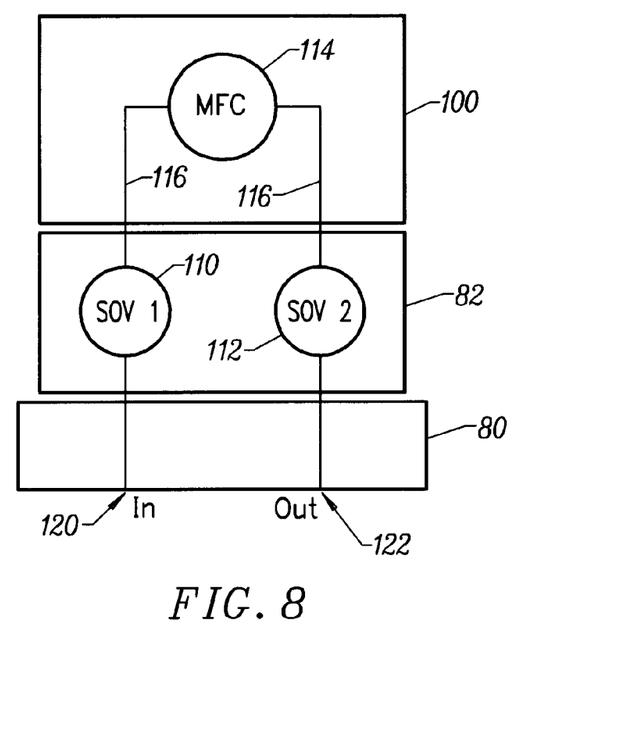
FIG. 8 is a schematic of various fluid control components incorporated into stacked orthogonal mounting devices of the invention.

FIG. 8 is a schematic side view of the first orthogonal component plate 82 with a first shut-off valve 110 and a second shut-off valve 112. The second orthogonal component plate 100 is illustrated as including a mass flow controller 114. An interior channel 116 through the first and second orthogonal component plates establishes a continuous fluid path between the input port 120 and the output port 122.

FIG. 8 demonstrates a number of benefits associated with the invention. First, the figure demonstrates that more than one fluid control component may be mounted on an orthogonal component plate. FIG. 8 also demonstrates the efficiency associated with the stacked configuration of the invention. The second orthogonal component plate 100 allows still another fluid control component to be mounted on a single component substrate. This reduces the size and cost of fluid control equipment.

Figure 9:
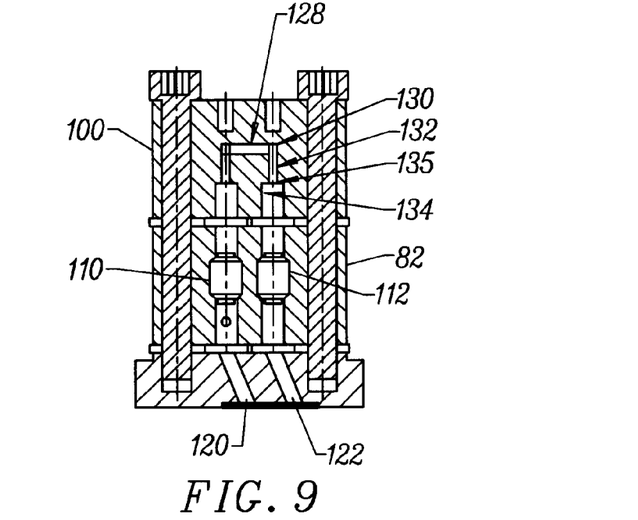
FIG. 9 is a cross-sectional view of fluid control paths and fluid control components within stacked orthogonal mounting devices of the invention.

FIG. 9 is a cross-sectional view of the apparatus of FIG. 8. The figure illustrates a first micromechanical shut-off valve 110 positioned adjacent to the input port 120. The first orthogonal component plate 82 also includes a second micromechanical shut-off valve 112 adjacent to the output port 122. The second orthogonal component plate 100 includes a proportional valve 128, a pressure sensor 130, an orifice 132, a second pressure sensor 134, and a temperature sensor 135, in combination forming a mass flow controller 114.

Figure 10:
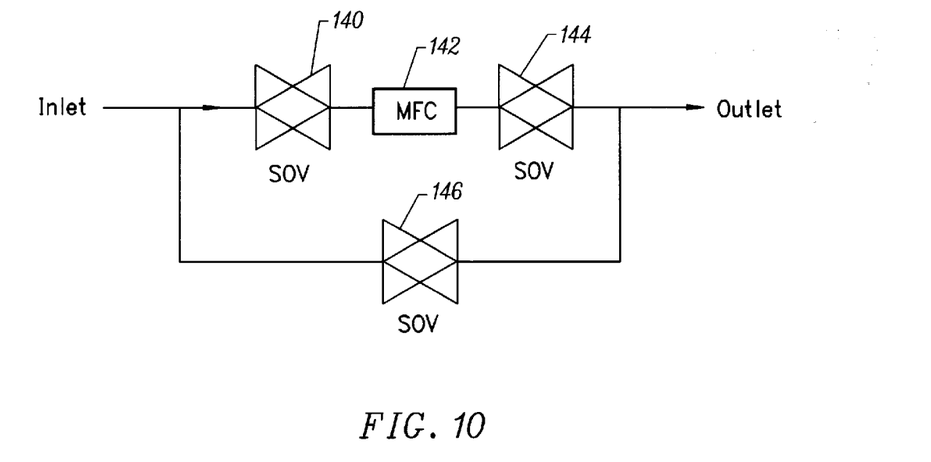
FIG. 10 is a schematic of various fluid control components that may be incorporated into the stacked orthogonal mounting devices of the invention.

Those skilled in the art will appreciate that a wide variety of alternate fluid control configurations may be implemented in accordance with the invention. By way of example, FIG. 10 illustrates one such alternate configuration. FIG. 10 illustrates a bypass shut-off valve 146 for selectively routing a fluid around a mass flow controller 142, which has associated shut-off valves 140 and 144.

Figure 11:
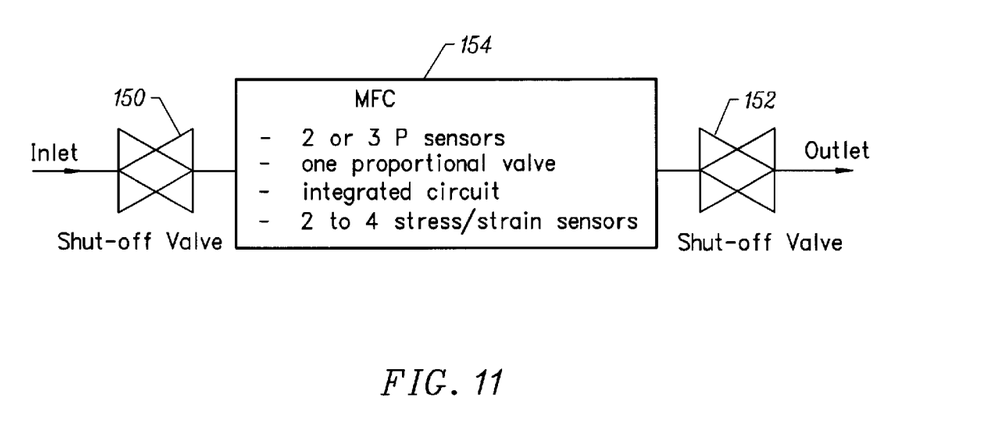
FIG. 11 is a schematic of various fluid control components that may be incorporated into an orthogonal mounting device of the invention.

FIG. 11 is a simplified illustration of a mass flow controller 154 that includes a set of pressure sensors, a proportional valve, a set of stress sensors, and a micro-controller. Shut-off valves 150 and 152 are positioned on either side of the mass flow controller 154.

Figure 12:
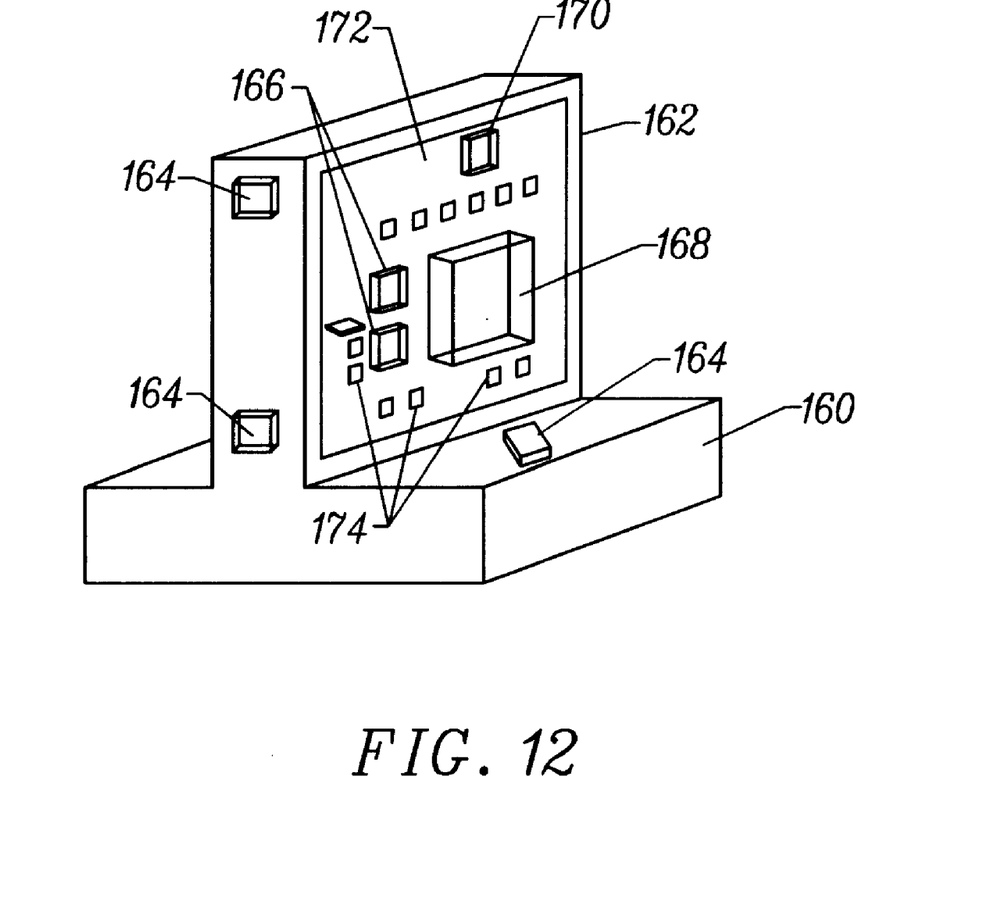
FIG. 12 illustrates fluid control components of FIG. 11 incorporated into an orthogonal mounting device of the invention.

FIG. 12 illustrates an implementation of the mass flow controller 154 of FIG. 11. FIG. 12 illustrates a manifold interface plate 160 and an orthogonal component plate 162. Strain sensors 164 are positioned on the manifold interface plate 160 and the orthogonal component plate 162. As discussed below, the strain sensors 164 are used to measure mounting stress forces that may impact fluid control component output. Stress signals from the strain sensors 164 are processed by a micro-controller 170 in order to compensate for erroneous output attributable to mounting stress forces. FIG. 12 also illustrates pressure sensors 166, a proportional valve 168, each of which is positioned adjacent to a printed circuit board 172, which includes bond pads 174.

Figure 13:
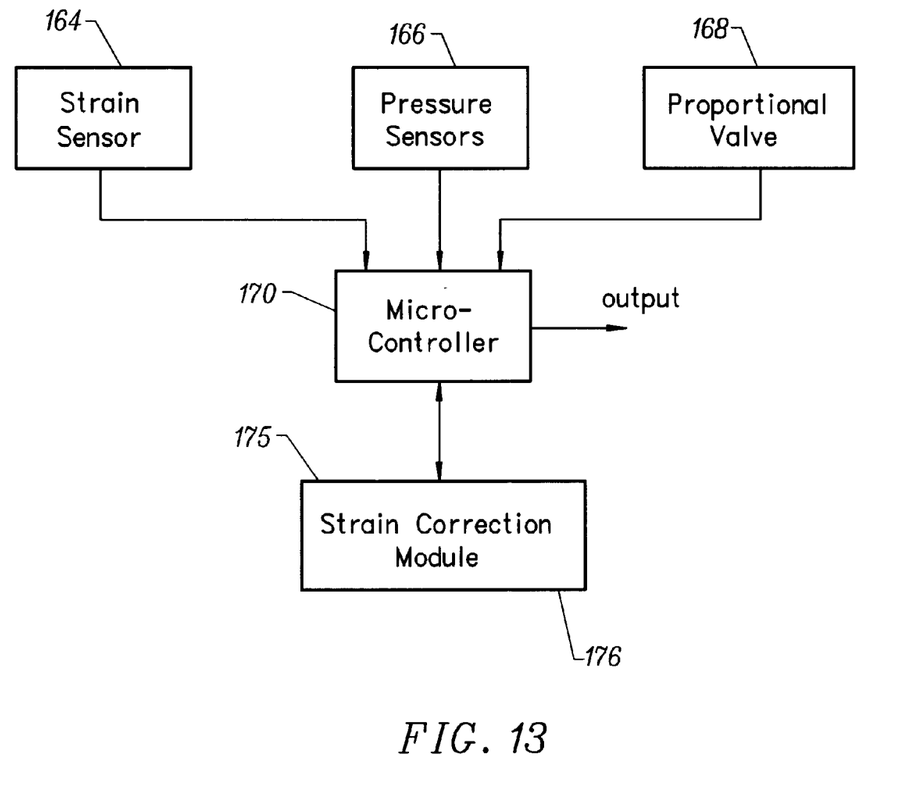
FIG. 13 is a schematic of a micro-controller utilized for signal correction in accordance with an embodiment of the invention.

The operation of the micro-controller 170 is appreciated with reference to FIG. 13. FIG. 13 illustrates that the micro-controller 170 receives input signals from the strain sensors 164, the pressure sensors 166, and the proportional valve 168. The micro-controller 170 is connected to a memory 175, which stores an executable program in the form of a strain correction module 176. The strain correction module 176 may also be implemented in a hardwired circuit or non-volatile memory. In the implementation of FIG. 13, the strain correction module 176 is executed by the micro-controller 170 to identify sensor signal drift due to stresses.

Figure 14:
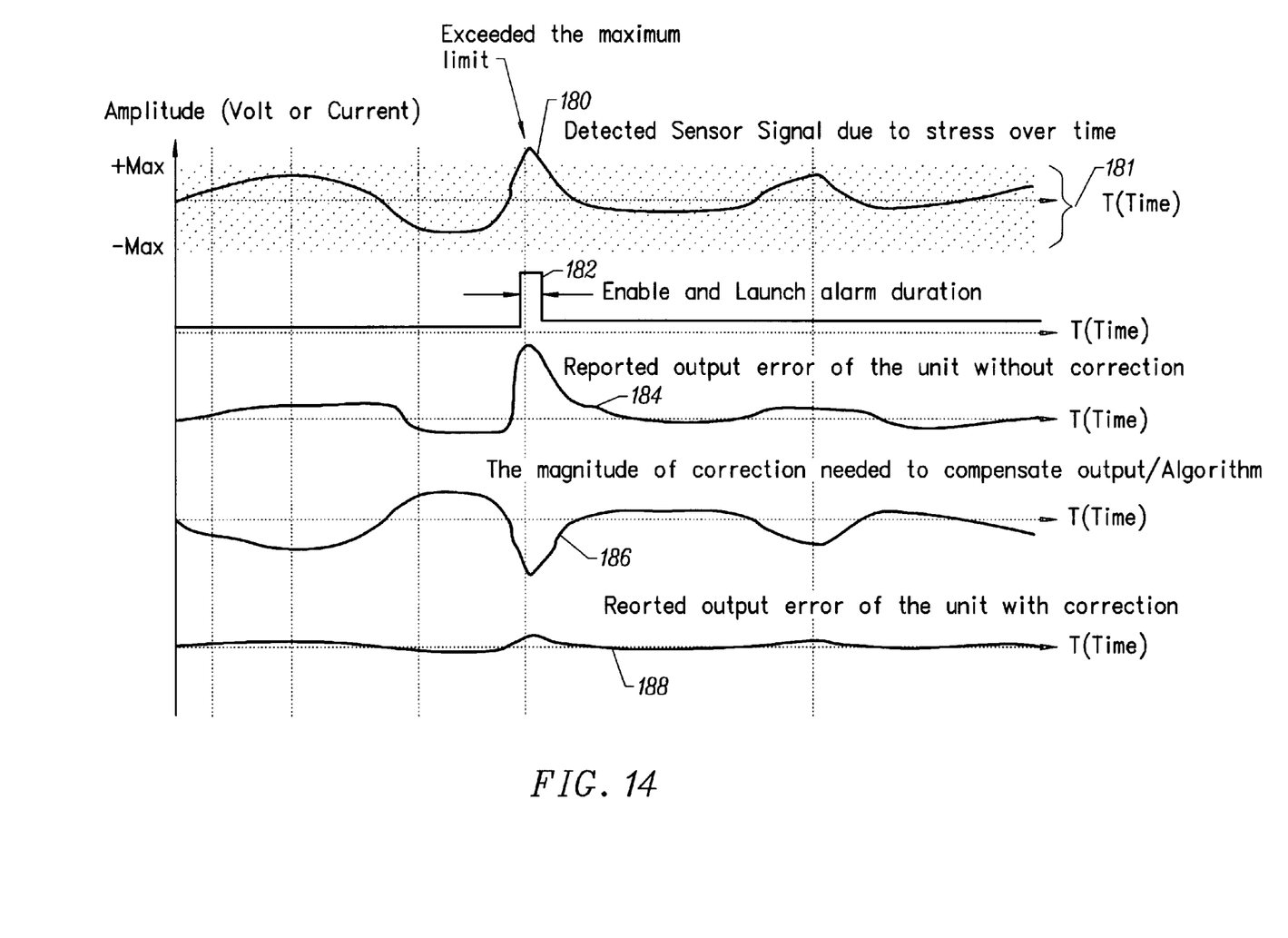
FIG. 14 illustrates fluid control component output signals processed in accordance with the apparatus of FIG. 13.

FIG. 14 illustrates a waveform 180 which has drifted out of a predefined error band 181. The micro-controller 170 identifies this drifting signal (which may be from the pressure sensor 166, proportional valve 168, or other fluid control component). In response to the signal drifting from the error band 181, an alarm signal 182 may be produced as output. The alarm signal may activate a light emitting diode on the device or it may be routed to a monitoring computer.

Waveform 184 illustrates a reported output error without correction. Based upon this observed signal, the micro-controller 170 generates a corrective signal, as shown with waveform 186. By combining waveforms 184 and 186, the micro-controller produces a corrected output signal 188. Accordingly, in an aspect of the invention, the micro-controller 170 adjusts the output signal from a fluid control component in response to stress signals from strain sensors 164.

Figure 15:
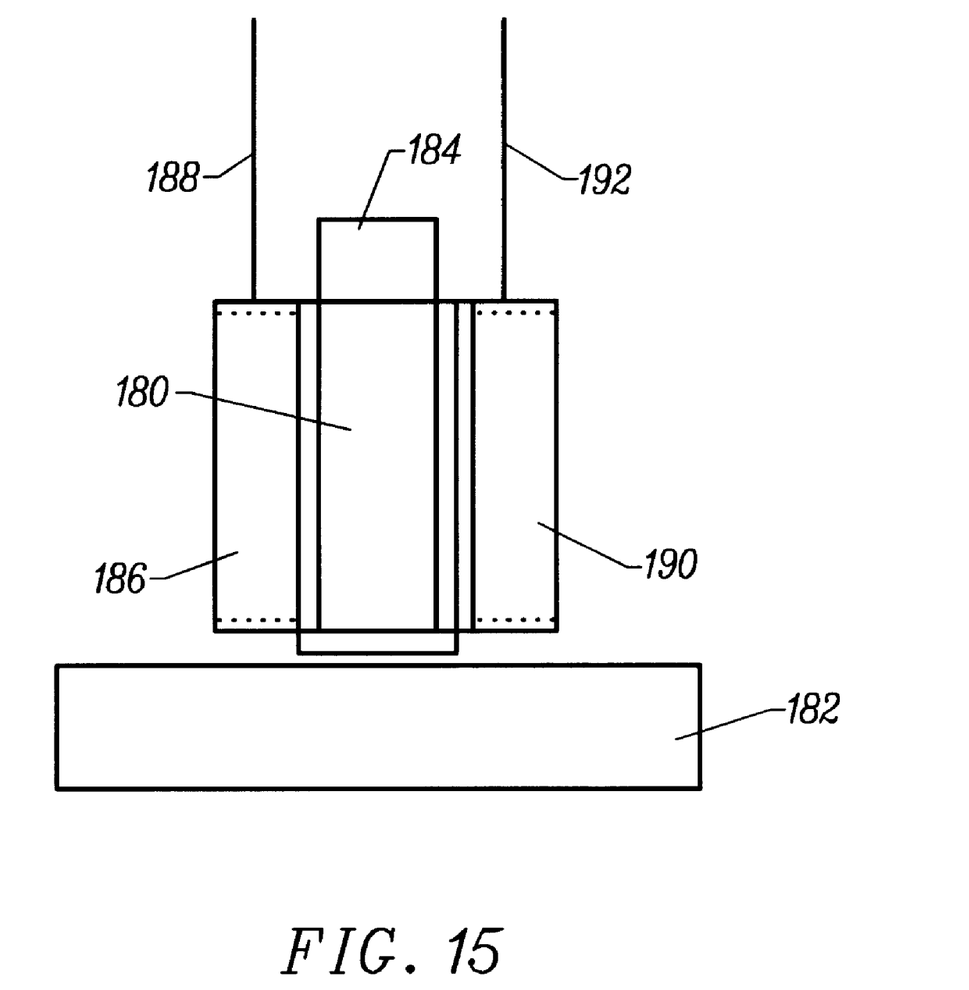
FIG. 15 illustrates a direct mount orthogonal component plate in accordance with an embodiment of the invention.

FIG. 15 illustrates an alternate embodiment of the invention. In the embodiment of FIG. 15, a direct mount orthogonal component plate 180 is attached directly to a manifold substrate 182. In other words, a manifold interface plate 160 is not used. Bolts 184 may be used for this direct connection. Individual fluid control components are mounted on the component plate 180 in the manner previously described. With this embodiment, the fluid control components are still isolated from the mounting stress forces produced by the manifold substrate.

FIG. 15 also illustrates a first electronic housing 186 with a first cable connector 188 and a second electronic housing 190 with a second cable connector 192. Thus, in this embodiment, fluid control components are mounted on both sides of a single orthogonal component plate 180.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An apparatus for mounting micromechanical fluid control components, comprising:

a manifold interface plate adaptable for connection to a manifold substrate oriented in a horizontal plane, said manifold interface plate receiving mounting stress forces from said manifold substrate along said horizontal plane; and an orthogonal component plate connected to said manifold interface plate in a vertical plane with respect to said horizontal plane of said manifold substrate, said orthogonal component plate including an orthogonal mounting surface with a micromechanical fluid control component mounted thereon, the position of said micromechanical fluid control component on said orthogonal mounting surface substantially isolating said micromechanical fluid control component from said mounting stress forces.

2. The apparatus of claim 1 further comprising a second orthogonal component plate positioned on said orthogonal component plate, said second orthogonal component plate including a second orthogonal mounting surface with a second micromechanical fluid control component mounted thereon.

3. The apparatus of claim 1 wherein said manifold interface plate and said orthogonal component plate include interior channels that form a continuous fluid path.

4. The apparatus of claim 3 wherein said orthogonal mounting surface includes ports in fluid communication with said continuous fluid path.

5. The apparatus of claim 4 wherein said micromechanical fluid control component includes apertures aligned with said ports.

6. The apparatus of claim 1 further comprising an electronics housing positioned on said orthogonal mounting surface.

7. The apparatus of claim 1 further comprising a plurality of fluid control components positioned on said orthogonal mounting surface.

8. The apparatus of claim 1 wherein said orthogonal component plate includes a second orthogonal mounting surface with a second micromechanical fluid control component positioned thereon.

9. The apparatus of claim 1 further comprising a micro-controller positioned on said orthogonal mounting surface.

10. The apparatus of claim 9 further comprising stress sensors positioned on said orthogonal component plate, said stress sensors generating stress signals in response to stress imposed upon said orthogonal component plate, said micro-controller adjusting the output signal from said fluid control component in response to said stress signals.

11. An apparatus for mounting micromechanical fluid control components, comprising:

an orthogonal component plate adapted for direct connection to a manifold substrate defined in a horizontal plane, said orthogonal component plate being oriented in a vertical plane with respect to said horizontal plane of said manifold substrate, said orthogonal component plate including an orthogonal mounting surface with a micromechanical fluid control component mounted thereon, the position of said micromechanical fluid control component on said orthogonal mounting surface substantially isolating said micromechanical fluid control component from mounting stress forces arising from said manifold substrate.

12. The apparatus of claim 11 wherein said orthogonal component plate includes a second orthogonal mounting surface with a second micromechanical fluid control component mounted thereon.

13. The apparatus of claim 11 further comprising a second orthogonal component plate positioned on said orthogonal component plate.

14. The apparatus of claim 11 further comprising a micro-controller positioned on said orthogonal mounting surface.

15. The apparatus of claim 14 further comprising stress sensors positioned on said orthogonal component plate, said stress sensors generating stress signals in response to stress imposed upon said orthogonal component plate, said micro-controller adjusting the output signal from said fluid control component in response to said stress signals.

16. A method of mounting micromechanical fluid control components, comprising the steps of:

attaching a manifold interface plate to a manifold substrate oriented in a horizontal plane, said manifold interface plate receiving mounting stress forces from said manifold substrate along said horizontal plane; and positioning a micromechanical fluid control component on an orthogonal mounting surface of an orthogonal component plate connected to said manifold interface plate in a vertical plane with respect to said horizontal plane of said manifold substrate, the position of said micromechanical fluid control component on said orthogonal mounting surface substantially isolating said micromechanical fluid control component from said mounting stress forces.

17. The method of claim 16 further comprising the step of positioning a second orthogonal component plate on first orthogonal component plate, said second orthogonal component plate including a second orthogonal mounting surface with a second micromechanical fluid control component mounted thereon.

18. The method of claim 16 further comprising the step of defining a continuous fluid path through said manifold interface plate and said orthogonal component plate.

19. The method of claim 16 further comprising the step of collecting stress signals in response to stress imposed upon said orthogonal component plate.

20. The method of claim 19 further comprising the step of adjusting the output signal from said fluid control component in response to said stress signals.

* * * * *